United States Patent [19]

Kowligi et al.

[11] Patent Number: 5,466,509

[45] Date of Patent: Nov. 14, 1995

[54] TEXTURED, POROUS, EXPANDED PTFE

[75] Inventors: Rajagopal R. Kowligi, Phoenix, Ariz.; John M. Bibeau, Burlinton, Mass.; Howard H. Taylor, Tempe, Ariz.

[73] Assignee: IMPRA, Inc., Tempe, Ariz.

[21] Appl. No.: 5,482

[22] Filed: Jan. 15, 1993

[51] Int. Cl.$^6$ ..................................................... B32B 27/16
[52] U.S. Cl. ..................... 428/141; 428/152; 428/304.4; 428/315.7; 428/422; 428/543
[58] Field of Search ................................. 428/304.4, 422, 428/315.7, 543, 141, 152; 521/145, 919

[56] References Cited

U.S. PATENT DOCUMENTS

| | | | |
|---|---|---|---|
| 3,833,455 | 9/1974 | Rosenblatt et al. | 428/141 |
| 4,187,390 | 2/1980 | Gore | 428/304.4 |
| 4,344,996 | 8/1982 | Banks et al. | 428/141 |
| 4,374,690 | 2/1983 | Canterino et al. | 156/229 |
| 5,066,565 | 11/1991 | Martinez et al. | 430/296 |
| 5,071,609 | 12/1991 | Tu et al. | 264/119 |

Primary Examiner—George F. Lesmes
Assistant Examiner—Blaine Copenheaver
Attorney, Agent, or Firm—David G. Rosenbaum

[57] ABSTRACT

A more porous PTFE is obtained by impressing a pattern into extruded PTFE and then expanding the PTFE. The pattern can be impressed by knurling or, preferably, by rolling the sheet between rollers having a pseudo-random pattern formed on the surface of the roller. The uniformity of the pores is controlled by the pattern; viz. a coarse pattern produces a wider distribution of internodal distances than a finer pattern.

14 Claims, 2 Drawing Sheets

TEXTURED, POROUS, EXPANDED PTFE

BACKGROUND OF THE INVENTION

This invention relates to porous, expanded PTFE (poly-tetra-fluoroethylene) and, in particular, to an improved process for imprinting a predetermined texture on porous, expanded PTFE.

Experiments in the early 1900's established venous and arterial autografting (replacing a section of a patient's blood vessel with a section of vein from elsewhere in the patient) as an effective technique for replacement of damaged or defective blood vessels. However, the need went beyond what could be treated by this technique, leading to a search for artificial or prosthetic veins and arteries for implanting in the vascular system. The need includes not only replacements for veins and arteries but also grafted blood vessels which can withstand repeated puncturing, e.g. for patients undergoing hemodialysis.

At present, synthetic vascular grafts are made by knitting or weaving synthetic materials, such as Dacron®, or by stretching or expanding PTFE (Teflon®). The different precesses for making grafts produce grafts of different porosity; i.e. woven Dacron grafts are the most porous and expanded PTFE is the least porous. Porosity affects how easily the graft is sutured, how much leakage there will be during and after surgery, and how well or quickly tissue can incorporate the graft after surgery.

Because of the other desirable properties of PTFE, e.g. stability and compatibility, it has long been desired to increase the porosity of expanded PTFE. Expanded PTFE is produced in either tubular or sheet form for use as vascular grafts. In tubular form, PTFE is used to replace defective or damaged veins or arteries. In sheet form, sections of the sheet are cut to size and sutured to a vein or artery as a patch to repair or close an incision in the wall of the vessel. A more porous form of expanded PTFE would have many additional uses, e.g. for filtering particles from liquid or gas, for gas separation, for controlled or damped release of gas or liquid, for wrapping or bandaging.

As disclosed for example in U.S. Pat. No. 4,187,390—Gore (herein the "Gore" patent), expanded PTFE is typically made by a cold extrusion process in which a paste of PTFE and lubricant is forced under pressure through a shaped nozzle. The extruded sheet is calendered by pressing the sheet between smooth rollers. The sheet thins and spreads and may be passed through several sets of rollers until it achieves the desired thickness, e.g. 0.4–0.6 mm. Since calendering increases the tensile strength of the sheet in the direction of movement through the rollers, the sheet is usually rotated between passes to increase tensile strength in all directions. The sheet is then expanded and kept expanded during "sintering," i.e. raising the temperature of the sheet approximately to its melting point, approximately 340° C., and then allowing the sheet to cool. After sintering, the sheet retains its shape and is ready for use. It is desired that any technique for increasing the porosity of PTFE be compatible with this process.

Expanded PTFE has a microscopic structure of nodes interconnected by fibrils and is normally not very porous. One measure of porosity is dimensional, e.g. 8–10 microns. Unlike most other polymers, for PTFE this dimension is not the diameter of a hole or pore through the sheet but is the distance from one node to another among a plurality of nodes making up a pore. Since the nodes are interconnected by fibers, the dimension is a measure of fiber length. On a macroscopic level, a patch of such material feels less pliable, e.g. wraps less easily, and is more difficult to puncture than other graft materials.

In view of the foregoing, it is therefore an object of the invention to provide a vascular graft made from expanded PTFE having a higher porosity than has been obtainable in the prior art.

A further object of the invention is to provide an expanded PTFE sheet having both high porosity and high tensile strength.

Another object of the invention is to provide an expanded PTFE sheet in which porosity is more uniform.

A further object of the invention is to provide an expanded PTFE sheet having high porosity and high suture strength.

SUMMARY OF THE INVENTION

The foregoing objects are achieved in the invention in which a PTFE sheet is knurled prior to expanding. The combination of knurling and expanding produces a high porosity without decreasing tensile strength. It is believed that pores form at a plurality of pinch points, produced by the knurling, rather than elsewhere. The pattern of pinch points in the PTFE sheet can be produced in a variety of ways, e.g. by pressing a knurled surface into the sheet, by pressing a textured surface such as cloth or paper into the surface of the sheet or subjecting the sheet to actinic radiation to weaken bonds in selected areas. Either one side or both sides of the sheet can be patterned. The sheet is expanded longitudinally and transversely about the same amount as in the prior art, e.g. 150–200% of the original surface area, producing both long and short fibrils of varying thicknesses. The sheet is maintained in an expanded condition during sintering, then cut to size, and packaged.

BRIEF DESCRIPTION OF DRAWINGS

A more complete understanding of the invention can be obtained by considering the following detailed description in conjunction with the accompanying drawings in which.

DETAILED DESCRIPTION

Figure 1:
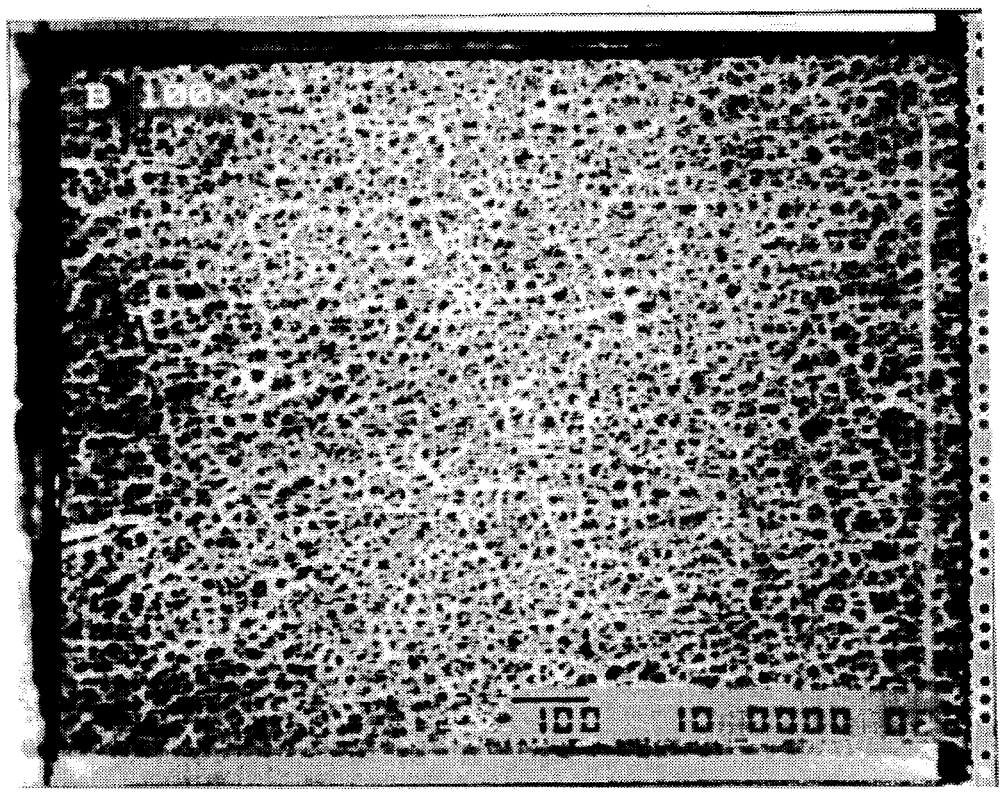
FIG. 1 is a photomicrograph of a PTFE sheet of the prior art.

FIG. 1 is a photomicrograph of a PTFE sheet which was extruded from PTFE paste, e.g. from what is known as "110 lube level" paste. As known in the art, "110" is the number of grams of lubricant per 500 grams of PTFE particles in the mixture. This lube level is typical in the art for making sheets of expanded PTFE. A typical lubricant is mineral spirits. After extrusion, the sheet is dried, rolled to the desired thickness, and then expanded and sintered. FIG. 1 is a 100× enlargement of a PTFE sheet made as described above and the nodes and fibrils are clearly evident. The fine, lace-like structure actually has a low porosity.

In accordance with the invention, a sheet is made as described above, except that, before expanding, the sheet is patterned to make a plurality of sites or defects at which pores will form. Rolling and patterning can be combined by using a textured roller for the last rolling of the sheet. Either one or both sides of the sheet can be patterned. After patterning, the sheet is expanded and sintered.

Figure 2:
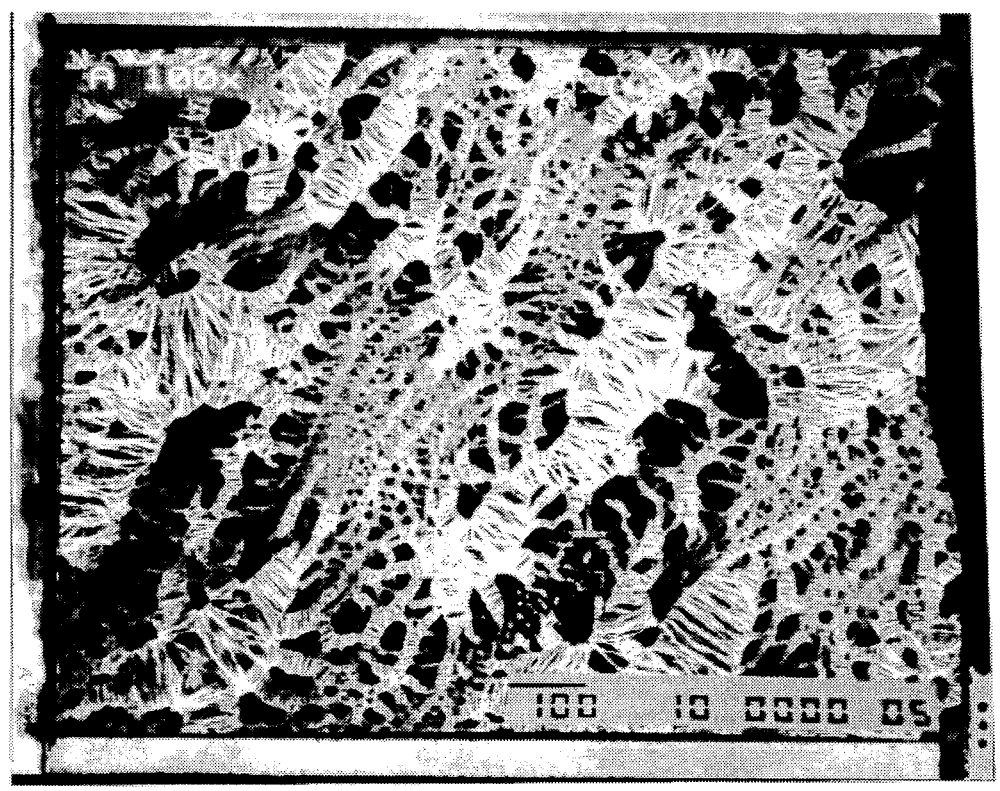
FIG. 2 is a photomicrograph of a PTFE sheet made in accordance with the invention.

FIG. 2 is a 100× enlargement of a portion of a sheet made in accordance with the invention. In particular, the sheet was rolled on a flat surface with a knurled roller having a 96 pitch diamond pattern. The sheet was rolled several times, in different directions, on both sides. At 100×, the more porous structure is clearly evident. Some of the fibrils long, some are short, some are thick, and some are fine. The structure is more open, i.e. more porous. The porosity is non-uniform in the sense that the distribution of internodal distances is fairly wide, in contrast to the more uniform, but smaller, internodal distances in the patch shown in FIG. 1.

A sheet made in accordance with the invention is more porous than non-patterned sheets of the prior art and other properties of the sheet are unimpaired. The following Table shows the results of a series tests on knurled and non-knurled sheets. Each item of data is the average of several samples. LTS is linear tensile strength and MTS is matrix tensile strength.

TABLE

|  | non-knurled | knurled |
| --- | --- | --- |
| wall thickness (mm.) | 0.63 | 0.64 |
| specific gravity | 0.74 | 0.71 |
| LTS (psi) | 2352 | 2286 |
| MTS (psi) | 6982 | 7059 |
| burst strength (psi) | 334.2 | 325.2 |
| suture retention (g) | 1770 | 1983 |

The internodal distances in the knurled PTFE sheet are greater than in non-knurled sheets of the prior art. As indicated by the data in the Table, the other properties, i.e. the items in column one of the Table, are comparable with non-knurled PTFE. In other words, the MTS, LTS, burst strength, and suture retention of PTFE are not impaired by patterning the PTFE prior to expansion.

When a sheet is knurled in several directions, the impressed pattern is random. It is preferred to use a single roll with a standard texture pattern, such as SPI (Society of Plastics Industry) pattern MT-11030. Using this pattern, internodal distances of 10–50 microns are obtained with good uniformity. This is a much higher porosity than obtainable from non-patterned, but otherwise identical sheets, which have internodal distances of 2–10 microns.

The SPI patterns are computer generated patterns in which the shape, orientation, and height or thickness of the bumps are random with predetermined limits. Some patterns, such as SPI A-2, are extremely fine, producing a soft reflected image on a specular surface. Other patterns, such as MT-11100, are relatively coarse, about the same as sixty grit sandpaper. Pattern MT-11030 is approximately in the middle of this range and is preferred, although other patterns, such as MT-11010 and MT-11050, are suitable.

The pattern is applied to the rollers using conventional photographic transfer techniques; e.g. coating the contact surface of the rollers with photoresist, exposing the resist to an image of the pattern, etching the resist to form the pattern in the resist, etching the roller to transfer the image to the roller, and removing the remaining resist from the roller. Unexpectedly, despite the constrained randomness of the pattern, the resultant pores are uniformly distributed in the sheet. The rollers can be patterned by other techniques, e.g. sandblasting.

As understood by those of skill in the art, internodal distance depends, in large part, upon the amount of expansion. For sheets to be used as vascular patches, an expansion of 150–200% is typical. As described in more detail below, tubular grafts of PTFE are expanded 200–500%. Other applications, such as filters, may require a different range of expansion.

In a preferred embodiment of the invention, a mixture of PTFE powder and mineral spirits in a 110 mixture was extruded through a die held at a temperature of 35° C., producing a sheet having a thickness of 1.3 mm. The extruded sheet was calendered between smooth rollers at room temperature to a thickness of 0.8 mm. The calendering operation included a repetitive series of steps in which the sheet was calendered and folded in different directions and then calendered again to make the sheet as uniform as possible in all directions. After calendering, the sheet was passed between rollers having an SPI MT-11030 pattern on their contact surfaces, impressing the pattern on both sides of the sheet. The sheet was dried at 40° C. for sixty minutes, expanded 175%, sintered at 380° C. for eight minutes, and allowed to cool in air.

Sheets produced as described above exhibit a surface porosity distributed in the range of 10–50 microns and an MTS of about 8000 psi. Tubular PTFE is produced by a similar process, except that the tube is patterned between a mandrel and a roller, impressing the pattern on the outside and inside surfaces of the tube. Tubular PTFE exhibits a higher porosity because it is expanded more than a sheet, typically 200–500%, and is expanded in a single direction (longitudinally).

Figure 3:
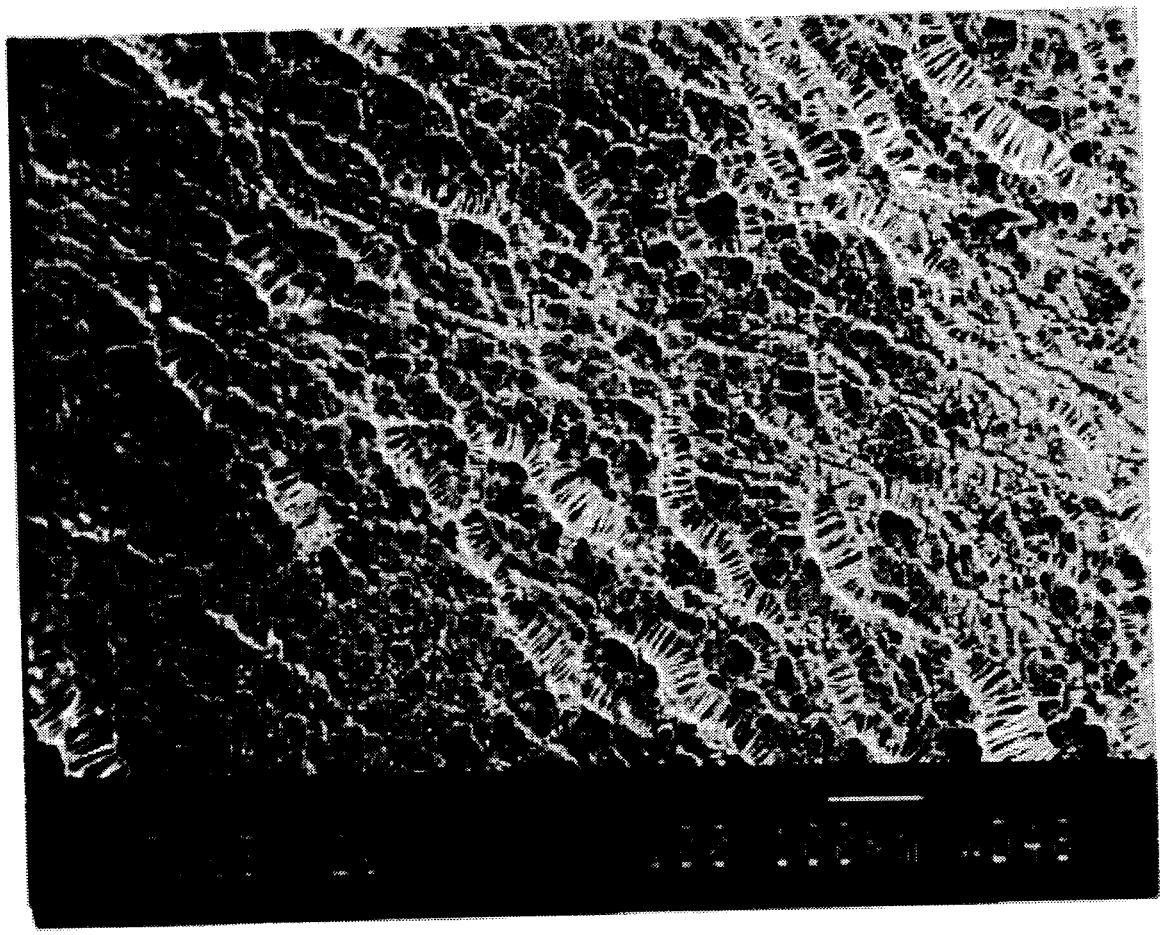
FIG. 3 is a photomicrograph of a PTFE sheet made in accordance with the invention, having a narrower distribution of internodal distances than the sheet shown in FIG. 2.

FIG. 3 is a 100× enlargement of a portion of a sheet made using the SPI MT-11030 pattern. Specifically, the sheet was extruded from 97 lube level paste and calendered and folded in a first direction and then again calendered and folded in the first direction. Then the sheet was calendered in the first direction and folded in a second direction, calendered and folded in the second direction, calendered in the second direction and folded in the first direction, and then calendered in the first direction. The pattern was impressed in the sheet and the sheet was dried at 40° C. for one hour. The sheet was then expanded 150% at 275° C. and then sintered for 7.5 minutes at 375° C.

Unlike the sheet shown in FIG. 2, the porosity is more uniform in the sheet shown in FIG. 3; that is, the distribution of internodal distances is much narrower than the distribution of internodal distances of the sheet shown in FIG. 2. Like FIG. 2, the internodal distances are greater than in the prior art (FIG. 1). By varying the pattern impressed in the sheet, or tube, the distribution of the internodal distances can be varied. Other parameters, e.g. the temperature of the extruder and/or the temperature of the rollers, can be changed to change the average internodal distance. For example, raising the temperature during extrusion or calendering increases the internodal distance. Thus, one can control both the distribution or range of internodal distances as well as the median value. This provides one with a very flexible tool for controlling the porosity of expanded PTFE.

Any technique which will form a pattern of defect sites in the PTFE can be used in accordance with the invention; for example, high energy bombardment by solids, e.g. sandblasting, liquids or gases. The pattern in the sheet can be obtained by means other than impression, e.g. by subjecting the sheet to actinic radiation, e.g. ultra-violet, X-ray, or atomic particles, for weakening bonds in the sheet prior to expansion. Laser writing techniques are particularly useful since, depending upon the wavelength and intensity of the laser beam, a laser can pattern a sheet by weakening selected areas of a sheet prior to expansion or can sinter (strengthen) selected areas of a sheet prior to expansion. The sheet can be patterned in a liquid etch, e.g. using an etchant sold commercially under the name "Tetra-Etch," or in a plasma etch. The process for etching in a plasma is similar to that used for treating semiconductor wafers, except that a grid is placed over the sheet and the sheet is etched through the grid. Alternatively, sacrificial fillers, e.g. a salt such as NaCl, can be added to the paste prior to expansion. The salt is removed by rinsing the sheet in water prior to expansion. The sites occupied by the salt crystals form pores during expansion. A variation of this last process is to sprinkle salt on the sheet prior to the last calendering step, then removing the salt prior to expansion.

The invention thus provides a method for increasing the porosity and pliability of expanded PTFE without impairing other properties of the patch, e.g. tensile strength, suture strength, and burst strength. The uniformity can be increased or decreased simply by changing the pattern.

Having thus described several embodiments of the invention, it will be apparent to those of skill in the art that various modifications can be made within the scope of the invention. For example, as previously noted, the amount of expansion strongly affects the internodal distance while, to a lesser degree, the temperature of the extruder and the calender affect internodal distance. Tubular grafts can be patterned by other apparatus than a roller and a mandrel. For example, a split mold and mandrel or an expanding mandrel within a cylindrical mold can be used.

We claim:

1. An expanded polytetrafluoroethylene sheet produced by the process of extruding a mixture of polytetrafluoroethylene and a lubricant into a sheet; forming a pattern of defect sites in said sheet by one of impressing an external pattern into said sheet; high energy bombardment with solids, etching, laser irradiation and actinic irradiation; expanding said sheet; and sintering said sheet, whereby the expanded polytetrafluoroethylene sheet is characterized by having internodal distances non-uniformly distributed across the range of 10–200 microns.

2. The expanded polytetrafluoroethylene sheet produced by the process of claim 1 wherein said expanding step further comprises expanding said sheet sequentially in different directions.

3. A sheet of expanded polytetrafluoroethylene as set forth in claim 1 wherein said internodal distances are distributed in the range of 10–50 microns.

4. A sheet of expanded polytetrafluoroethylene as set forth in claim 3 wherein said internodal distances are distributed in the range of 20–40 microns.

5. The sheet of expanded polytetrafluoroethylene according to claim 1, wherein said pattern of defect sites is formed by imparting a plurality of sacrificial sites in said sheet and removing said sacrificial sites before expanding said sheet.

6. The expanded polytetrafluoroethylene sheet produced according to the process of claim 5, wherein said texturing step further comprises application of a textured surface to at least one surface of said sheet and applying positive pressure to said textured surface thereby imparting the plurality of defect sites in said sheet.

7. The expanded polytetrafluoroethylene sheet produced according to the process of claim 5, wherein said step of applying positive pressure further comprises calendaring.

8. The expanded polytetrafluoroethylene sheet produced according to the process of claim 5, wherein said texturing step further comprises high energy bombardment of external matter directed toward at least one surface of said sheet whereupon impact of said external matter imparts the plurality of defect sites in the sheet.

9. The expanded polytetrafluoroethylene sheet produced according to the process of claim 5, wherein said texturing step further comprises etching said sheet.

10. The expanded polytetrafluoroethylene sheet produced according to the process of claim 9, wherein said etching further comprises one of chemical or plasma etching.

11. The expanded polytetrafluoroethylene sheet produced according to the process of claim 5, wherein said texturing step further comprises exposing at least one surface of said sheet to one of laser or actinic irradiation.

12. An expanded polytetrafluoroethylene material produced by the process of extruding a mixture of polytetrafluoroethylene and a lubricant into a predetermined shape; forming at least one region of non-uniformly distributed nodes and fibrils in said shape, said nodes and fibrils having internodal distances non-uniformly distributed across the range of 10–50 microns, by one of impressing an external texturing pattern into said sheet, high energy bombardment with solids, etching, laser irradiation and actinic irradiation; expanding said shape; and sintering said shape.

13. The expanded polytetrafluoroethylene sheet produced by the process of claim 12 wherein said expanding step further comprises expanding said shape sequentially in different directions.

14. A sheet of expanded polytetrafluoroethylene as set forth in claim 12 wherein said internodal distances are distributed in the range of 20–40 microns.

\* \* \* \* \*